(12) United States Patent
Carlton et al.

(10) Patent No.: US 9,962,847 B2
(45) Date of Patent: May 8, 2018

(54) VEHICLE GLAZING PANEL CUT OUT

(71) Applicant: Belron Hungary Kft—Zug Branch, Zug (CH)

(72) Inventors: Alistair Carlton, Lincoln (GB); Patrick Weckx, Kuringen (BE)

(73) Assignee: Belron International Limited, Egham (GB)

(*) Notice: Subject to any disclaimer, the term of this patent is extended or adjusted under 35 U.S.C. 154(b) by 0 days. days.

(21) Appl. No.: 14/915,684

(22) PCT Filed: Sep. 20, 2013

(86) PCT No.: PCT/EP2013/069642
§ 371 (c)(1),
(2) Date: Mar. 1, 2016

(87) PCT Pub. No.: WO2015/039703
PCT Pub. Date: Mar. 26, 2015

(65) Prior Publication Data
US 2016/0193743 A1 Jul. 7, 2016

(51) Int. Cl.
B26D 1/547 (2006.01)
B26B 27/00 (2006.01)
B60J 1/00 (2006.01)
B60J 1/02 (2006.01)

(52) U.S. Cl.
CPC ............ *B26D 1/547* (2013.01); *B26B 27/002* (2013.01); *B60J 1/02* (2013.01); *Y10T 29/49719* (2015.01); *Y10T 83/9292* (2015.04)

(58) Field of Classification Search
CPC .......... B26D 1/547; B26D 7/00; B26D 7/006; B26D 3/003; B26D 5/08; B26D 2001/008; B26D 27/002; B25B 11/007; Y10T 83/04
USPC ........ 83/651.1, 200.1, 39, 745, 450; 30/116, 30/294, 272.1
See application file for complete search history.

(56) References Cited

U.S. PATENT DOCUMENTS

| | | | |
|---|---|---|---|
| 5,622,093 A | 4/1997 | Hutchins | |
| 6,591,502 B1* | 7/2003 | Gmeilbauer | .......... B26B 27/002 |
| | | | 30/116 |
| 6,616,800 B2 | 9/2003 | Eriksson | |
| 2002/0121330 A1 | 9/2002 | Eriksson | |
| 2007/0214649 A1* | 9/2007 | Hess | .................... B26B 27/002 |
| | | | 30/116 |
| 2008/0017295 A1* | 1/2008 | Finck | ........................ B26B 7/00 |
| | | | 156/108 |

(Continued)

FOREIGN PATENT DOCUMENTS

| | | |
|---|---|---|
| CA | 2034221 | 7/1991 |
| CN | 102078665 A | 6/2011 |

(Continued)

Primary Examiner — Laura M Lee
(74) Attorney, Agent, or Firm — Gordon & Jacobson, P.C.

(57) ABSTRACT

A method for removing a glazing panel bonded to a frame by an interposed bonding material, the method utilizing a flexible cutting line and has a set up phase resulting in the line being looped around substantially the entire the periphery of the glazing panel with opposed end portions of the line being secured on separate winder spools. In a cut out phase, the line is wound on to one of the winder spools while simultaneously being wound off the other of the winder spools.

14 Claims, 2 Drawing Sheets

(56) References Cited

U.S. PATENT DOCUMENTS

| | | | | |
|---|---|---|---|---|
| 2009/0283214 A1* | 11/2009 | Nelson | ............... | B26B 27/002 |
| | | | | 264/173.11 |
| 2010/0132882 A1* | 6/2010 | Hess | ............... | B26B 27/002 |
| | | | | 156/250 |
| 2015/0314981 A1* | 11/2015 | Finck | ............... | B26D 1/547 |
| | | | | 242/159 |
| 2016/0193743 A1* | 7/2016 | Carlton | ............... | B62D 65/00 |
| | | | | 83/13 |

FOREIGN PATENT DOCUMENTS

| | | | |
|---|---|---|---|
| DE | 4012207 C1 | 10/1991 | |
| EP | 0093283 A2 | 11/1983 | |
| GB | 2084918 A * | 4/1982 | ............ B28B 11/14 |
| GB | 2494548 A | 3/2013 | |
| GB | 2526308 A | 11/2015 | |
| GB | 2533679 A | 6/2016 | |
| SU | 655663 | 4/1979 | |
| WO | WO 86/07017 A1 | 12/1986 | |
| WO | WO 98/58779 A1 | 12/1998 | |
| WO | WO 2006/030212 A1 | 3/2006 | |
| WO | WO 2010/067046 A1 | 6/2010 | |
| WO | WO 2011101668 A1 * | 8/2011 | ................ B21F 1/02 |

\* cited by examiner

VEHICLE GLAZING PANEL CUT OUT

CROSS-REFERENCE TO RELATED APPLICATIONS

This application is the National Stage of International Patent Application No. PCT/EP2013/069642 filed on Sep. 20, 2013 and is hereby incorporated by reference herein in its entirety.

BACKGROUND

1. Field

The present invention relates to a vehicle glazing panel cut out technique.

2. State of the Art

Vehicle glazing panels such as vehicle windscreens (windshields) are typically bonded in supporting frames by adhesive bonding material such as polyurethane, applied in a continuous bead about the periphery of the glazing panel and frame.

Wire cutting techniques have been previously proposed and used to effect glazing panel removal (for replacement or otherwise). Exemplary techniques are disclosed in, for example, EP-A-0093283, Canadian Patent Specification 2034221, U.S. Pat. No. 6,616,800, German Patent 4012207 and PCT Publications WO2006/030212, WO86/07017, WO98/58779 and GB2494548. In particular WO2006/030212 and GB2494548 disclose techniques in which, during cutting, the wire can be operated in certain circumstances to slip or slide with respect to the bonding material in order to saw or cut through the bonding material. This has proved advantageous.

SUMMARY

An improved technique and apparatus has now been devised.

According to a first aspect, the present invention provides a method for removing a glazing panel bonded to a frame by an interposed bonding material, the method utilizing a flexible cutting line and comprising:
  a set up phase resulting in the line being looped around substantially the entire the periphery of the glazing panel, opposed end portions of the line being secured on separate winder spools; and,
  a cut out phase in which the line is wound on to one of the winder spools whilst simultaneously being wound off the other of the winder spools.

It is preferred that the cutting line comprises a synthetic fibre line.

Beneficially, at the set up phase, the winder spools are provided with a cutting line wound on the spools.

It is preferred that, in the set up phase, the winder spools are mounted to the glazing panel and the line is wound off one, or each, of the winder spools to form a loop of wire around the entire periphery of the glazing panel.

It is preferred that one or more of the following are features of the set up procedure:
  i) In setting up, the winder unit is initially provided (loaded) with a significant length of the line already wound onto the respective winder spools and preferably positioned on the inside of the windshield.
  ii) The winder spool ratchets are toggled to the ratchet position which permits the cutting line to be drawn off the respective winder spools.
  iii) line is pulled off the loaded spools, preferably separate lengths being drawn around pulleys and crossed over.
  iv) A pinched apex of line is drawn out and pushed through a hole formed in the PU bonding bead.
  v) The pinched apex of line is drawn from inside to outside the vehicle, at a position below the winder spools.
  vi) The pinched and drawn out apex he loop of the line is expanded and looped around the entire periphery of the windshield externally of the vehicle and positioned adjacent the PU bead.

In a preferred realisation, the two winder spools are provided on a single common winder unit.

The (or each) winder spool is preferably provided with a mounting arrangement for mounting the winder spool on the glazing panel.

A winder spool is preferably provided with at least one line wrap around guide element spaced from the winder spool.

In a preferred embodiment the wrap around guide element may comprise a rotatably mounted guide wheel or pulley. Beneficially, two winder spools are arranged in side by side arrangement an a respective wire guide wheel or pulley is positioned outwardly of each respective winder spools.

It is preferred that one or both of the winder spools includes a ratchet arrangement enabling spool rotation in one or other direction to be inhibited.

Beneficially the ratchet can be toggled from a ratchet rotation forward direction to either or both of:
  i) a ratchet override position or
  ii) a ratchet rotation reversed position,
  thereby permitting line already wound on the winder spool, to be wound off the winder spool.

According to a second aspect, the present invention provides vehicle cut out apparatus comprising first and second winder spools provided with mounting means for mounting on a vehicle glazing panel, the winder spools being loaded with multiple turns of separate ends of the same flexible synthetic cutting line such that a length of cutting line extends between the winder spools.

The invention will now be further described by way of example and with reference to the accompanying drawings.

DETAILED DESCRIPTION

Figure 1:
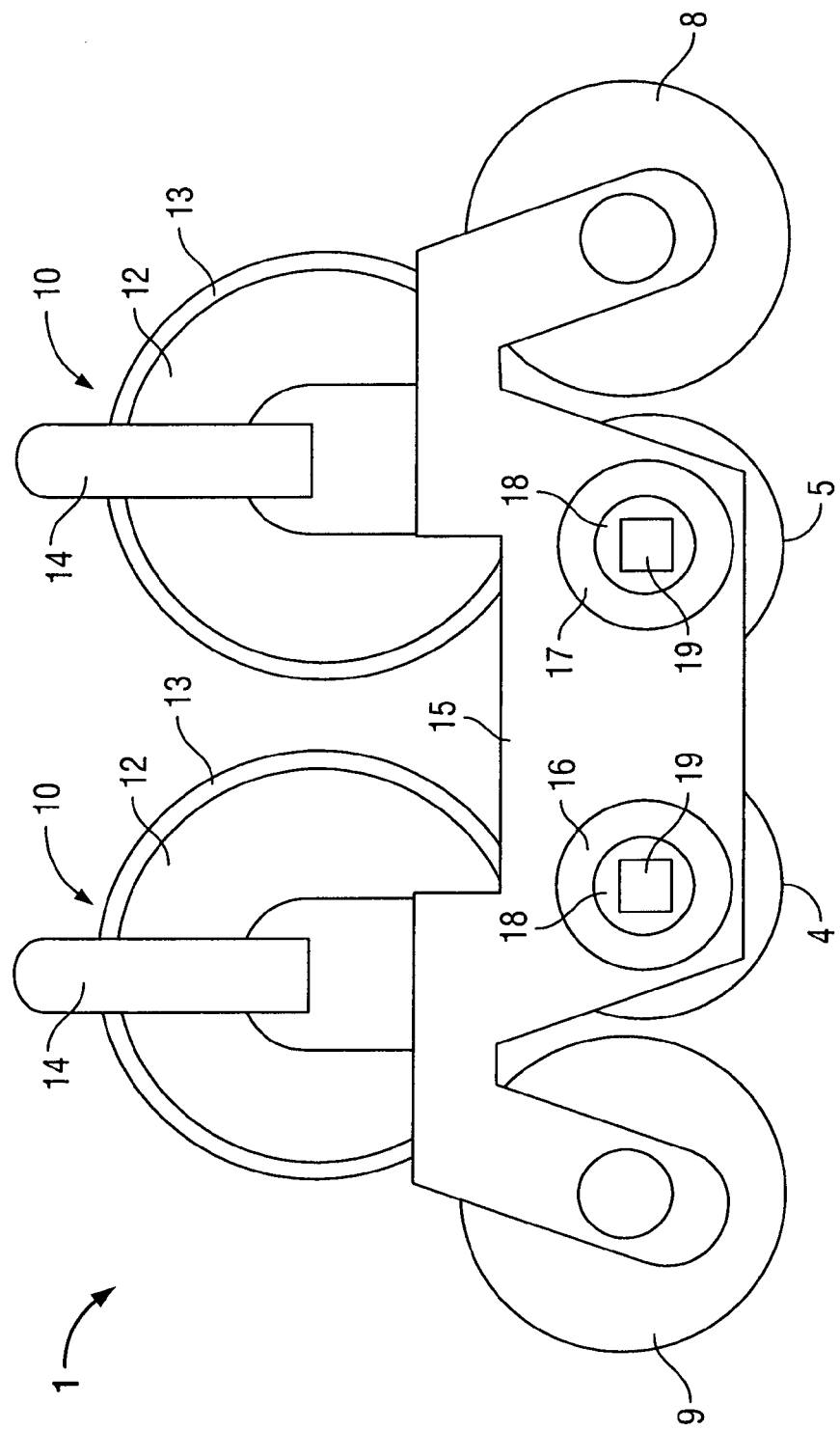
FIG. 1 is a schematic plan view of a winder unit of an exemplary cut out system in accordance with the method of the invention.

Referring to the drawings, and initially to FIGS. 1 to 4, there is shown a cut out system particularly for use in cut out of bonded vehicle glazing panels such as windscreens. The cut out system comprises a winder unit 1 and a wire dispenser unit 2.

The winder unit 1 comprises a pair of releasable suction cup mounts 10, 11 enabling the winder unit to be releasably secured to the windscreen. The suction cup mounts comprise a rigid plastics cup 12 and underlaying flexible rubber skirt membrane 13. Respective actuation/release levers 14 enable consistent suction to be applied and released. Such suction mounts are commonly employed in windscreen replacement and repair technology. The suction cup mounts 10, 11 are pivotably/tiltably mounted to the support bracket 15 of the winder unit to ensure that both mounts 10, 11 can locate in good engagement with the windscreen despite the curvature of the windscreen. The main body of the support bracket 15 carries a pair of underslung winding spools 4, 5 in side by side relationship. The spools are connected to axial winding shafts which are supported in bearings 16, 17 provided on the winder unit. The spools 4, 5 are driven axially rotationally either manually via a hand winder or by means of a mechanical actuator such as a motorised winding or winching tool.

Drive bosses 18 are provided with female sockets 19 (square bores) for receiving the male driving tool. Positioned outwardly of the winding spools are respective wire guide pulley wheels 8, 9 of low friction plastics material. The pulley wheels are mounted to be rotatable about respective rotational axes. The guide pulleys rotate as the cutting wire is drawn tangentially across the pulleys as will be described. The winder spools 4, 5 are held to rotate in one direction only (each in opposite senses) by respective ratchet mechanisms. Each mechanism includes ratchet override permitting prior tightened wire to be slackened, or unwound (reverse wound).

A prior art technique is disclosed in WO2006/030212 and in particular, in the technique shown in FIGS. 9 and 10 of that disclosure, the glazing panel is removed using a wire 41 and the winder unit 1, which is initially secured to the steering wheel side of the glazing panel, positioned above the steering wheel as shown in FIG. 9. With the winder unit and guide arrangement in position as described, the cutting wire is looped around the outside of the windscreen to lie peripherally adjacent the bonding bead which is sandwiched between the glazing panel and the support frame of the vehicle. Opposed ends of the cutting wire are fed through a pierced channel made through the bonding bead in the corner of the windscreen (x) below the position of the winder unit 1.

A length 41 of the wire is pulled through to the interior of the vehicle and passed around pulley wheel 9 of the winder unit and connected for winding to the winder spool 5 of the winder unit. A free end length of wire 47 is pulled through, being of length sufficient to reach the upper left hand corner of the glazing panel. Winder spool 5 is then operated to cause the wire length 41 to cut through the bonding bead upwardly along the side of the windscreen, until the cut line has passed around the upper right hand corner of the screen. At this juncture, the unit 1 is removed from the screen and repositioned on the glazing panel in the upper left hand corner as shown in FIG. 10. Prior to repositioning the unit 1, the ratchet of winder spool 5 is released to permit the wire to be wound out from the spool as it is moved across the glazing panel to be repositioned. The ratchet is subsequently re-engaged and spool 5 once again operated to wind in the wire from the position shown in FIG. 10 until it reaches the position shown in the dashed line in FIG. 10.

Next the unit 1 is moved around the corner of the glazing panel and through substantially a right angle, to the position shown in FIG. 11, where it is secured to the glazing panel. In order to enable this to be achieved, the ratchet of spool 5 is again released and subsequently re-engaged when the unit is in position as shown in FIG. 11. The end of the free length of wire 47 is then wound around pulley 8 and connected to winder spool 4 and the spools 4 and 5 operated either sequentially (or simultaneously) to complete the cut. As shown in FIG. 11. The lengths of wire cross at Z in order to complete the cut.

Figure 2:
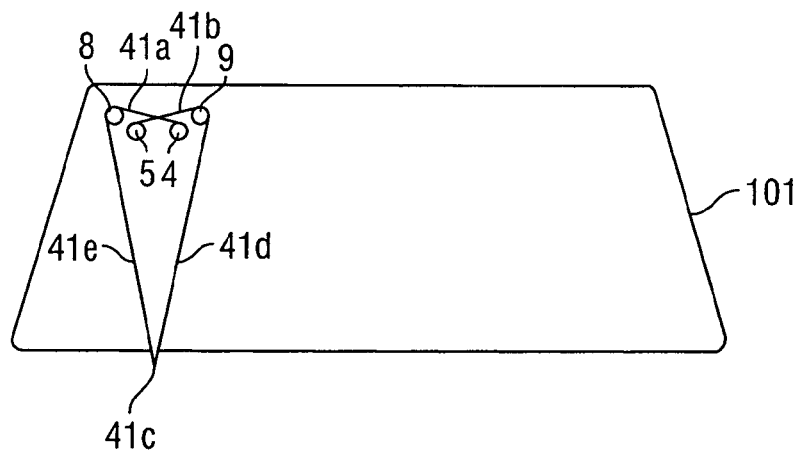
FIGS. 2 and 3 are schematic representations in sequence of a cut out technique in accordance with the invention.

In the technique of GB2494548 the winder unit 1 is secured internally of the vehicle to the surface of the glazing panel 3 above the steering wheel as shown in FIG. 2 of that document. A wire dispenser spool 2 is secured to the exterior surface of the glazing panel 3 and the wire 41 is wrapped around the external peripheral edge of the glazing panel staring at corner A and proceeding to corners B C and D. The wire subsequently passes adjacent the lowermost edge of the screen (from D toward A) where a free end is pulled through an aperture made in the PU bonding bead at the corner A, such that the free end of the wire can be attached to winder spool 5. An adhesive tape patch 6 is secured to the screen over the wire. The dispenser spool 2 includes a sucker mount 2a and an internal wire dispenser cartridge which is free to rotate in a housing so as to pay out wire from the dispenser spool as tension of a required magnitude is put upon the wire. The adhesive tape patch is used to give resistance to paying out of the wire from the spool. Other brake devices (typically resistance or friction providing devices may be used in addition to or as an alternative to the adhesive patch 6).

Removal is commenced by winding the spool 5 to move the cut from the corner A upwardly along the side edge and around corner B. During cutting, if excessive resistance occurs, from tough or large PU adhesive beads, the wire is able to spool off the dispenser spool 2 and slip and slice past the PU adhesive. The use of the spool dispenser mounted on the windscreen enables this 'slip cutting' to occur early in the cut out procedure and without pre cutting of the other free end of the wire 41. Once the cutting wire 40 has travelled around the corner B, the winder unit 1 is moved across the windscreen to the other side and re-secured to the windscreen in the configuration shown in FIG. 3 of GB2494548. Prior to repositioning the unit 1, the ratchet of winder spool 5 is released to permit the wire to be wound out from the spool 5 as it is moved across the glazing panel to be repositioned. The ratchet is subsequently re-engaged and spool 5 once again operated to wind in the wire.

When the cut has almost been completed along the top edge, the winder unit is rotated through 90 degrees and re-secured as shown in FIG. 4 of GB2494548. The cut is then progressed such that the cut position passes around the corner C. The adhesive tape 6 is next removed and enough wire is payed out from the dispenser spool 2 to reach and be wound on the winder spool. The measured length of wire is then cut from the dispenser spool and the cut free end is pulled into the vehicle either by prising out the already released corner of the windscreen to form a small gap, or insertion of the free wire end through the pre-formed hole in the PU bonding material at corner A. The free end of the wire 41 is then connected to the spool 4 (passing around pulley 8). The winder spool 4 is then operated to wind in the wire, in so doing cutting along the bottom edge.

The present invention seeks to improve upon the prior art techniques by utilizing slip cutting in a more controlled and consistent manner. In accordance with the present invention, a loop of the cutting line is formed around the periphery of the entire windscreen 101 in the set up procedure and the cutting line is attached at opposed ends to each of the respective winders spools. In the cut out procedure when winding in on one of the winder spools 4,5 the other is configured to allow the cutting line to be drawn off the respective spool. In other words the line is attached to both spools during the cutting procedure and slip is achieved by permitting winding off from one of the spools as the line is wound on to the other. As a result there can be constant slip cutting throughout substantially the entire process (certainly for the majority of the cut out process).

The ratchets of the respective winder mechanism are toggled between a 'forward ratchet permitted' position and a 'reverse ratchet permitted' position (or a ratchet off position) to enable winding onto or off a respective winder spool 4,5 during the cut out procedure. During the procedure, the winder unit 1 can be repositioned (in a similar manner as for the prior art techniques) as required in order to improve the cutting angle. In repositioning the units, the winder spool ratchets are operated to permit the line to be wound of one or other of the winder spools (or both) during repositioning.

In setting up, the winder unit is initially provided (loaded) with a significant length of the line already wound onto the respective winder spools and positioned on the inside of the windshield. The winder spool ratchets are toggled to the ratchet position which permits the cutting line to be drawn off the respective winder spools and line is pulled off the loaded unit, separate lengths 41a 41b being drawn around pulleys 8,9 crossed over as shown in FIG. 2. A pinched apex 41c of the loop of line 41 is drawn out and pushed through a hole formed in the PU bonding bead. Thus the pinched apex 41c of the line 41 is drawn from inside to outside the vehicle, at a position below the winder unit 1.

Figure 3:
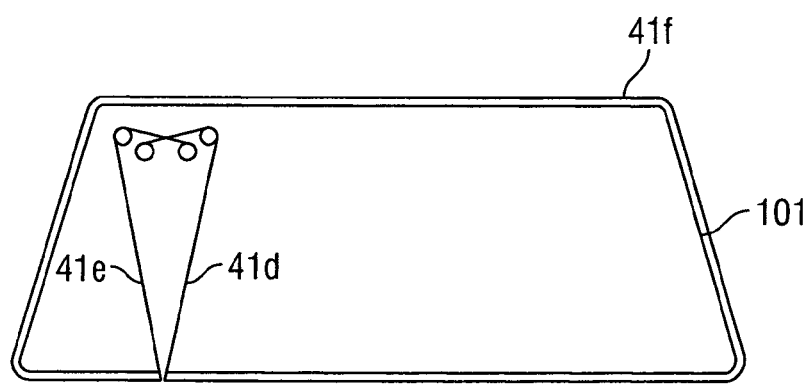

Next the loop of the line is expanded and looped around the entire periphery of the windshield 101 externally of the vehicle and positioned adjacent the PU bead. This is shown in FIG. 3, where the unit 1 is positioned internally of the vehicle and the lengths 41d 41e are also internally but the remainder of the loop 41f is externally of the vehicle. When in position as shown in FIG. 3, the winder spools can be operated as described above to slip cut the PU bead and release the windscreen from the supporting frame.

This novel technique has been found to work most effectively when used with a woven synthetic fibre cutting line rather than a metal cutting wire.

The invention claimed is:

1. A method for removing a glazing panel bonded to a frame by an interposed bonding material, the method utilizing a flexible cutting line and comprising:
   a set up phase resulting in the cutting line being looped around substantially the entire periphery of the glazing panel, opposed end portions of the cutting line being secured on separate winder spools; and
   a cut out phase in which the cutting line is wound on to one of the winder spools while simultaneously being wound off the other of the winder spools;
   wherein, in the set up phase, the winder spools are provided with the cutting line wound on the winder spools and the winder spools are mounted to the glazing panel and the cutting line is wound off one, or each, of the winder spools to form a loop of the cutting line around the entire periphery of the glazing panel.

2. A method according to claim 1, wherein the cutting line comprises a synthetic fiber line.

3. The method according to claim 1, wherein the winder spools are provided on a single common winder unit.

4. The method according to claim 1, wherein at least one particular winder spool of the winder spools is provided with a mounting arrangement for mounting the particular winder spool on the glazing panel.

5. The method according to claim 1, wherein at least one particular winder spool of the winder spools is provided with at least one line wrap around guide element spaced from the particular winder spool.

6. The method according to claim 5, wherein the wrap around guide element comprises a rotatable guide wheel or rotatable pulley.

7. The method according to claim 1, wherein the winder spools are arranged in side by side arrangement and respective wire guide wheels or pulleys are disposed on opposite sides of the side by side arrangement of the winder spools.

8. The method according to claim 1, wherein one or both of the winder spools includes a ratchet arrangement enabling spool rotation in one direction while inhibiting rotation in the opposite direction.

9. The method according to claim 8, wherein the ratchet arrangement can be toggled from a ratchet forward direction to either or both of:
   i) a ratchet override position or
   ii) a ratchet reversed position, thereby permitting cutting line already wound on the winder spool, to be wound off the winder spool.

10. The method according to claim 1, wherein one or more of the following are features of the set up phase:
   i) winder spool ratchets are provided and configured in a ratchet position which permits the cutting line to be drawn off the winder spools;
   ii) the cutting line is pulled off the winder spools;
   iii) separate lengths of the cutting line are drawn around pulleys and cross over one another;
   iv) a pinched apex of the cutting line is drawn out and pushed through a hole formed in a PU bonding bead;
   v) a pinched apex of the cutting line is drawn from inside to outside the vehicle; and
   vi) the cutting line is looped around the entire periphery of the windshield externally of the vehicle and positioned adjacent a PU bonding bead.

11. The method according to claim 1, wherein, in the set up phase, the winder spools are initially provided with a length of the cutting line wound onto the winder spools and the winder spools are positioned on the inside of the windshield.

12. A method for removing a glazing panel bonded to a frame by an interposed bonding material, the method utilizing a flexible cutting line and comprising a set up phase resulting in the line being looped around substantially the entire periphery of the glazing panel, opposed end portions of the cutting line being secured on separate winder spools, wherein, in the set up phase, the winder spools are provided with the cutting line wound on the winder spools and the winder spools are mounted to the glazing panel and the cutting line is wound off one, or each, of the winder spools to form a loop of cutting line around the entire periphery of the glazing panel.

13. The method according to claim 12, wherein the cutting line comprises a synthetic fiber line.

14. The method according to 12, wherein the winder spools are provided on a single common winder unit.

* * * * *